United States Patent
McCoy, II et al.

(10) Patent No.: US 11,092,437 B1
(45) Date of Patent: Aug. 17, 2021

(54) LEVEL INDICATOR FOR TELESCOPIC SIGHTS

(71) Applicant: FLATLINE OPS, INC., Bellingham, WA (US)

(72) Inventors: Charles A. McCoy, II, New Meadows, ID (US); Brent R. McCoy, Bellingham, WA (US)

(73) Assignee: FLATLINE OPS, INC., Bellingham, WA (US)

( * ) Notice: Subject to any disclaimer, the term of this patent is extended or adjusted under 35 U.S.C. 154(b) by 0 days.

(21) Appl. No.: 17/120,787

(22) Filed: Dec. 14, 2020

Related U.S. Application Data

(63) Continuation of application No. 29/738,579, filed on Jun. 18, 2020, now Pat. No. Des. 906,467.

(51) Int. Cl.
  *G01C 9/28* (2006.01)
  *F41G 1/54* (2006.01)

(52) U.S. Cl.
  CPC .................... *G01C 9/28* (2013.01); *F41G 1/54* (2013.01)

(58) Field of Classification Search
  CPC .................... G01C 9/28; F41G 1/54
  See application file for complete search history.

(56) References Cited

U.S. PATENT DOCUMENTS

| | | | |
|---|---|---|---|
| 191,389 A | 5/1877 | Ward et al. | |
| 2,529,801 A | 11/1950 | Fisk | |
| 2,717,447 A * | 9/1955 | Marcus | F41G 11/001 42/127 |
| 2,748,494 A | 6/1956 | Raney | |
| 2,757,458 A * | 8/1956 | Zipser | G01C 9/24 33/373 |

(Continued)

FOREIGN PATENT DOCUMENTS

| | | |
|---|---|---|
| DE | 334394 | 3/1921 |
| EP | 0497301 A2 | 8/1992 |

(Continued)

OTHER PUBLICATIONS

International Searching Authority, ISR & Written Opinion, PCT/US2017/050136, dated Jan. 11, 2018, 7 pages.

(Continued)

*Primary Examiner* — Nimeshkumar D Patel
*Assistant Examiner* — Tania Courson
(74) *Attorney, Agent, or Firm* — Eric B. Fugett; Mark A. Pitchford; Pitchford Fugett, PLLC

(57) ABSTRACT

A level indicator for a telescopic sight can comprise a lower clamp member including a first end defining a threaded aperture and a second end defining a cylindrical head, and an upper clamp member including a first end defining an access hole and a second end defining a socket in which the cylindrical head is receivable. The upper clamp member is rotatable about the cylindrical head to form between the respective first ends of the clamp members a gap through which the telescopic sight is receivable into a space defined between the upper and lower clamp members. A level housing in which a level is received can extend from either clamp member. A single threaded fastener is receivable in the threaded aperture through the access hole to secure the upper clamp member to the lower clamp member around the telescopic sight.

17 Claims, 15 Drawing Sheets

(56) References Cited

U.S. PATENT DOCUMENTS

| | | |
|---|---|---|
| 2,782,511 A | 2/1957 | Ivy |
| 2,803,880 A * | 8/1957 | Weaver ............... F41G 11/002 42/128 |
| 2,886,998 A | 5/1959 | Scott |
| 2,937,448 A * | 5/1960 | Dimick ............... F41G 11/007 42/126 |
| 3,041,938 A | 7/1962 | Seabrook |
| 3,096,109 A * | 7/1963 | Callahan ............. F16B 7/0493 403/385 |
| 3,253,361 A * | 5/1966 | Kingsbury ........... F41G 11/003 42/124 |
| 3,295,811 A * | 1/1967 | Giwosky ............. F41G 11/003 248/229.11 |
| 3,386,695 A * | 6/1968 | Blood ................. F41G 11/003 248/229.11 |
| 3,463,430 A * | 8/1969 | Jimenez .............. F41G 11/003 42/124 |
| 3,491,975 A * | 1/1970 | Weaver ............... F41G 11/001 42/124 |
| 3,568,324 A | 3/1971 | Jorczak |
| 3,624,947 A | 12/1971 | Worrall |
| 4,154,001 A * | 5/1979 | Serafin ............... G01C 9/28 33/373 |
| 4,208,801 A | 6/1980 | Blair |
| D260,165 S * | 8/1981 | Ross ................... D22/110 |
| 4,457,078 A * | 7/1984 | Suchy ................ B25H 1/0085 33/334 |
| 4,574,508 A * | 3/1986 | Ross ................... F41G 11/003 42/124 |
| 5,005,308 A | 4/1991 | Parks |
| 5,086,566 A * | 2/1992 | Klumpp ............. F41G 11/003 42/126 |
| 5,223,650 A | 6/1993 | Finn |
| 5,315,781 A | 5/1994 | Beisner |
| 5,402,579 A * | 4/1995 | Smith ................. B25B 5/067 33/334 |
| 5,406,733 A | 4/1995 | Tarlton et al. |
| 5,459,935 A | 10/1995 | Paulson et al. |
| 5,630,279 A | 5/1997 | Slates |
| 5,657,571 A | 8/1997 | Peterson |
| 5,787,630 A * | 8/1998 | Martel ................ F41G 11/003 42/125 |
| 5,878,504 A | 3/1999 | Harms |
| 6,237,462 B1 | 5/2001 | Hawkes et al. |
| 6,499,382 B1 | 12/2002 | Lougheed et al. |
| 6,701,632 B2 | 3/2004 | Henry ................ F41G 1/467 124/87 |
| 6,705,037 B2 * | 3/2004 | Van Kirk ........... F41G 11/002 42/124 |
| D505,177 S * | 5/2005 | Fell .................... D22/110 |
| 6,978,569 B2 | 12/2005 | Williamson, IV et al. |
| 7,261,263 B2 * | 8/2007 | Baker ................. A47F 5/04 24/24 |
| 7,530,193 B2 | 5/2009 | Williamson, IV et al. |
| D594,318 S * | 6/2009 | Fell .................... D22/110 |
| 7,543,405 B1 | 6/2009 | Ivey |
| 7,562,484 B2 * | 7/2009 | Kim ................... F41G 11/003 24/282 |
| 7,665,699 B2 * | 2/2010 | Oddsen, Jr. ........ F16B 2/10 248/224.7 |
| 7,677,755 B2 * | 3/2010 | Kim ................... F41G 11/003 362/190 |
| 7,967,265 B2 * | 6/2011 | Oddsen, Jr. ........ F16L 3/085 248/224.7 |
| 8,051,574 B1 | 11/2011 | Kronengold et al. |
| 8,171,666 B2 * | 5/2012 | Karagias ............ F41G 11/003 42/124 |
| 8,572,885 B2 * | 11/2013 | Karagias ............ F41G 11/003 42/124 |
| 8,689,454 B2 | 4/2014 | Pulkrabek ........... F41G 1/467 124/87 |
| 8,695,266 B2 | 4/2014 | Moore et al. |
| 8,819,985 B1 | 9/2014 | McCoy et al. |
| 9,103,630 B1 | 8/2015 | McCoy ............... F41G 1/44 |
| 9,500,443 B2 | 11/2016 | McCoy, II et al. |
| 9,829,277 B2 * | 11/2017 | Ratliff ................ G02B 23/14 |
| D906,467 S | 12/2020 | Mccoy, II et al. |
| D907,160 S * | 1/2021 | McCoy, II .......... D22/108 |
| 10,914,553 B2 * | 2/2021 | McCoy, II .......... F41G 1/44 |
| 2001/0027620 A1 * | 10/2001 | Wooten .............. F41G 1/35 42/124 |
| 2003/0183733 A1 * | 10/2003 | Pisczak .............. H02G 7/053 248/74.1 |
| 2006/0101700 A1 | 5/2006 | Williamson, IV et al. |
| 2006/0162227 A1 | 7/2006 | Samson |
| 2007/0113460 A1 | 5/2007 | Potterfield et al. |
| 2007/0175080 A1 | 8/2007 | Sammut et al. |
| 2008/0022576 A1 * | 1/2008 | Epling ............... F41G 1/38 42/124 |
| 2009/0026679 A1 | 1/2009 | Harman |
| 2009/0107299 A1 | 4/2009 | Ploeger |
| 2011/0023348 A1 * | 2/2011 | Karagias ............ F41G 11/003 42/124 |
| 2012/0085014 A1 | 4/2012 | Riley et al. |
| 2014/0366424 A1 | 12/2014 | McCoy, II et al. ..... F41G 1/144 42/111 |
| 2015/0068098 A1 | 3/2015 | Stokes et al. |
| 2015/0168096 A1 | 6/2015 | Miller ................ F41G 1/44 42/71.01 |
| 2016/0025453 A1 | 1/2016 | Ratliff ................ F41G 1/345 42/131 |
| 2018/0094767 A1 | 4/2018 | McCoy |
| 2020/0191524 A1 | 6/2020 | McCoy, II .......... F41G 1/44 |

FOREIGN PATENT DOCUMENTS

| | | |
|---|---|---|
| FR | 1289286 A | 3/1962 |
| WO | 2018045389 A1 | 3/2018 |

OTHER PUBLICATIONS

Canadian Airgun Forum, Mounting Solutions Anti-Cant Device, Sep. 14, 2008, 11 pagges.

Junk Yard Genius, Mounting Solutions Anti-Cant Device, May 24, 2007, 4 pages.

Western Shooter, Mounting Solutions Anti-Cant Device, Apr. 18, 2008, 3 pages.

U.S. Appl. No. 12/973,567 Non-Final Office Action, dated Aug. 21, 2012, 11 pages.

U.S. Appl. No. 12/973,567 Non-Final Office Action, dated Feb. 20, 2013, 11 pages.

U.S. Appl. No. 12/973,567 Non-Final Office Action, dated May 29, 2013, 30 pages.

* cited by examiner

LEVEL INDICATOR FOR TELESCOPIC SIGHTS

CROSS-REFERENCES TO RELATED APPLICATIONS

This application is a continuation of U.S. patent application Ser. No. 29/738,579, filed Jun. 18, 2020 and titled "LEVEL INDICATOR FOR TELESCOPIC SIGHTS," the entire disclosure of which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to the field of firearms, and more particularly, to anti-cant devices for telescopic sights.

Telescopic sights, commonly known as "scopes," are often attached to or mounted on firearms to facilitate aiming of a projectile in a variety of shooting applications, including long range precision rifle shooting. A key factor that affects the ability of a shooter to hit a target with accuracy at long range is cant error. Cant error occurs when the shooter does not hold a rifle level (i.e., perfectly vertical or "plumb") while shooting. A rifle is level when the axis of the rifle barrel bore is in a vertical plane with the axis of the scope. For example, rotating the barrel axis out of the vertical plane around the axis of the scope in either a clockwise or a counter-clockwise direction will result in cant error. Canting (i.e., tilting) the firearm to either side results in a projectile impact that is lower than and horizontally displaced from the point of aim. Maintaining the rifle in a perfectly vertical (i.e., level) position while shooting is thus critical to accurate long range shot placement.

Most modern rifle scopes contain a reticle in the form of crosshairs. Crosshairs are most commonly represented as intersecting vertical and horizontal lines in the shape of a cross (e.g., "+"). Crosshairs can aid a shooter in maintaining a rifle in a level position during shooting by allowing the shooter to compare the vertical or horizontal crosshair to a corresponding visual reference object or structure that is visible through the scope and known to be vertical (e.g., a building) or horizontal (e.g., the horizon). However, in many circumstances, a good vertical or horizontal visual reference is not available, and the shooter can only estimate the vertical plane. This can introduce cant error into shot placement. It has therefore become common to employ an anti-cant device to more precisely identify the vertical plane and thereby ensure that a firearm remains level during shooting.

Numerous anti-cant devices are known. Some are designed to detachably attach to a rail of the firearm, as exemplified by the level indicator disclosed in U.S. Pat. No. 10,578,402, which is hereby incorporated herein by reference in its entirety. Others, such as the levels indicators disclosed in U.S. Pat. Nos. 8,819,985 and 9,103,630, each of which is hereby incorporated herein by reference in its entirety, detachably attach directly to the scope.

The scope-mounted anti-cant devices disclosed in U.S. Pat. Nos. 8,819,985 and 9,103,630 include half round collars or straps with two fasteners at one strap end and a uniaxial cylinder and socket connection or joint at the other strap end to connect the respective strap ends and thereby mount the devices on a scope. The joints permit only a single degree of freedom, namely, sliding movement along the axis of the male portion of the joint. These anti-cant devices can only be installed on a scope by separately placing each of the two straps on opposing sides of the scope (e.g., the top and bottom) with one strap adjacent to and forward of the other, then axially sliding the straps together along the longitudinal axis of the scope to place the male portion inside the female portion and thus connect the jointed ends of the straps. These axially slidable joints are neither rotatable nor pivotable about the male portion.

This design requires careful alignment of each strap relative to the other and enough free space along the longitudinal axis or length of a scope to permit a user to place the two halves of the device on the scope and perform the required axial sliding maneuver to join them around the scope. The free space required is necessarily greater than the width of either strap since one must be placed forward of the other before they can be axially joined. This limits the number of additional scope accessories and devices (e.g., lights, lasers, other optical devices) that may be mounted to or installed on the scope. No anti-cant device requiring no more free space along the length of the scope for installation than the width or thickness of the anti-cant device itself is presently known.

In addition, when mounted on a scope, the anti-cant devices of U.S. Pat. Nos. 8,819,985 and 9,103,630 can transmit force generated by tightening the fasteners radially outward from the longitudinal axis of the scope through the male and female jointed ends of the straps. This requires the straps to be relatively wide in order to strengthen the joint and maintain joint engagement. The use of such wide straps in turn necessitates the use of multiple fasteners to tightly secure the strap ends opposite the joint, despite that the use of multiple fasteners complicates installation and increases the risk that one or all of the fasteners can be dropped, misplaced, or lost during installation.

Accordingly, what is needed are improvements in anti-cant devices and level indicators for telescopic sights.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Features of the presently disclosed invention overcome or minimize some or all of the identified deficiencies of the prior art, as will become evident to those of ordinary skill in the art after a study of the information presented in this document.

Disclosed herein is a level indicator for a telescopic sight that includes a pair of hingedly engageable, arcuate lower and upper clamp members. When hingedly engaged via a uniquely shaped and angled cylindrical joint, the upper clamp member is rotatable relative to the lower clamp member to form a gap through which a telescopic sight is receivable into a spaced defined between opposing arcuate surfaces of the respective clamp members.

Installation of the level indicator requires no more space along the length of the telescopic sight than the width of either clamp member because the indicator can be placed an open configuration and positioned directly onto the sight. No axial sliding movement of level indicator components along the sight is required. A single threaded fastener selectably secures the two clamp members together around the telescopic sight. A female portion of the cylindrical joint pulls vertically against a male portion of the joint to tightly lock the male and female ends of the respective clamp members together as the threaded fastener is tightened in the opposite ends of the clamp members.

The level indicator is also provided with a skeletonized level housing which includes opposing upwardly extending lobes that suspend the level above a reflective arm in order to maximize ambient light refraction for optimal level fluid illumination and sight acquisition in all conditions and environments.

Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

To facilitate the understanding of the embodiments described herein, a number of terms are defined below. The terms defined herein have meanings as commonly understood by a person of ordinary skill in the portions relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

This description and appended claims include the words "below", "above", "over," "under," "side", "top", "bottom", "upper", "lower", "when", "vertical", "horizontal", "upright", etc. to provide an orientation of embodiments of the invention to allow for proper description of example embodiments. The foregoing positional terms refer to the assembly when in the orientation shown in FIG. 5. A person of skill in the art will recognize that the assembly can assume different orientations when in use.

Figure 5:
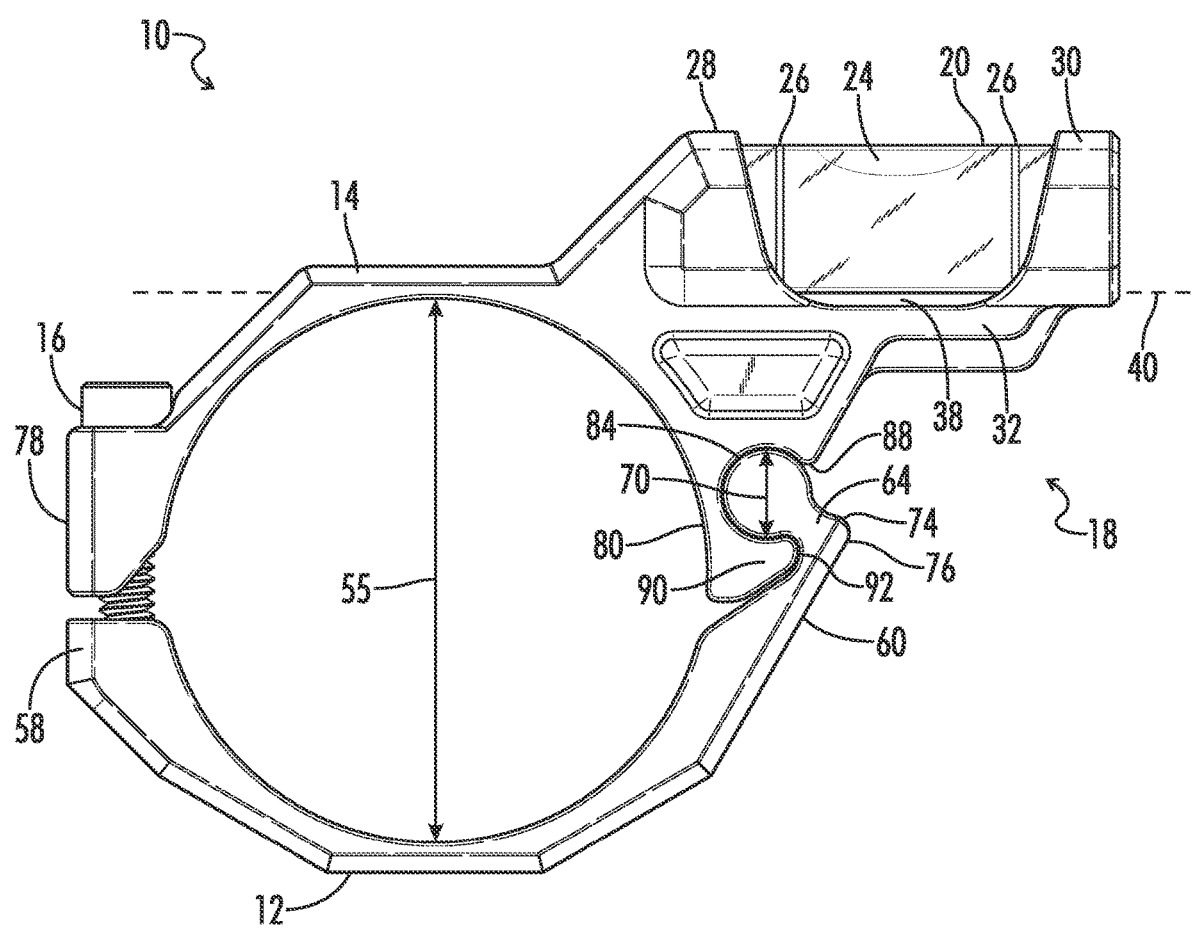
FIG. 5 is a front elevational view of the level indicator of FIG. 3, the back side being a being a mirror image thereof.
Figure 6:
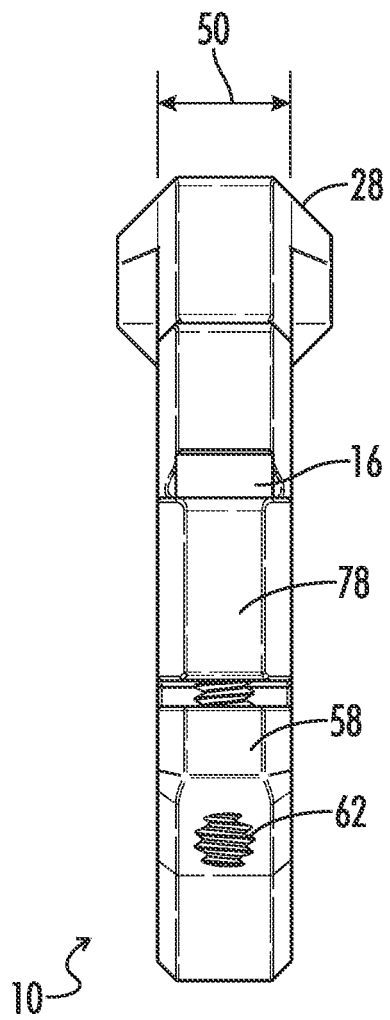
FIG. 6 is a right-side elevational view of the level indicator of FIG. 3.
Figure 7:
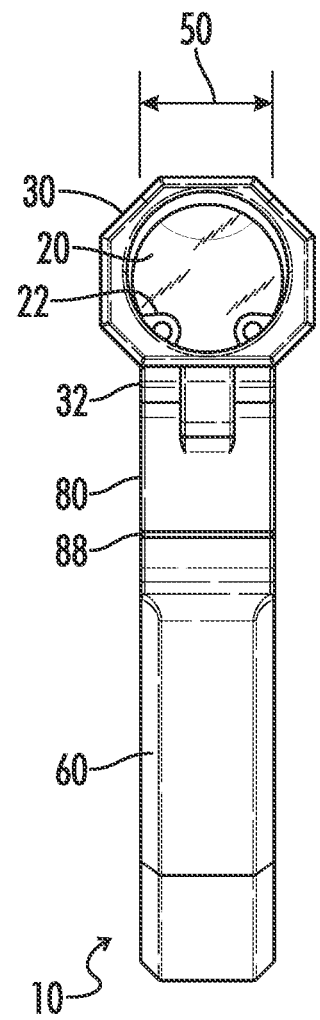
FIG. 7 is a left-side elevational view of the level indicator of FIG. 3.
Figure 8:
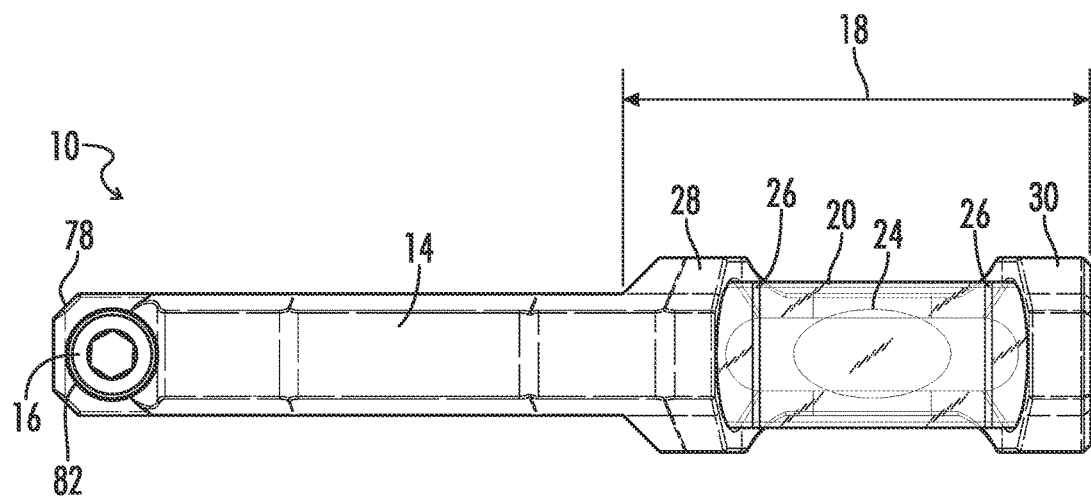
FIG. 8 is a top plan view of the level indicator of FIG. 3.
Figure 9:
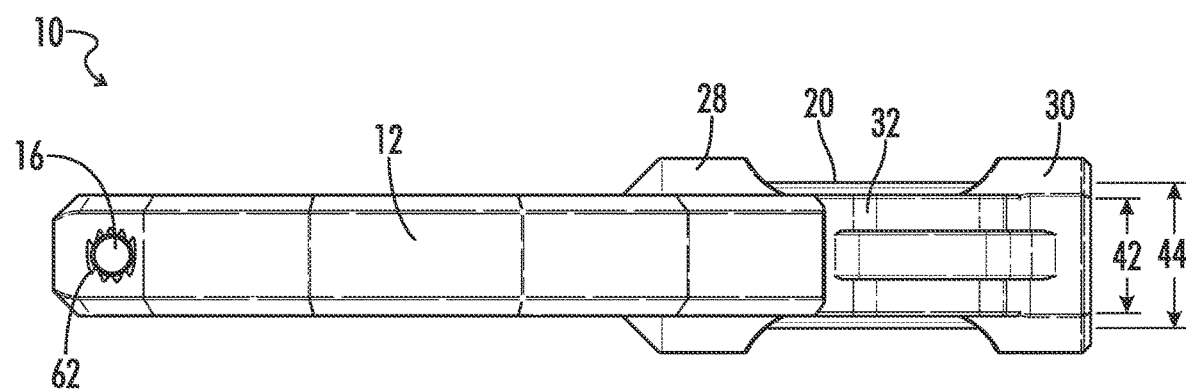
FIG. 9 is a bottom plan view of the level indicator of FIG. 3.
Figure 10:
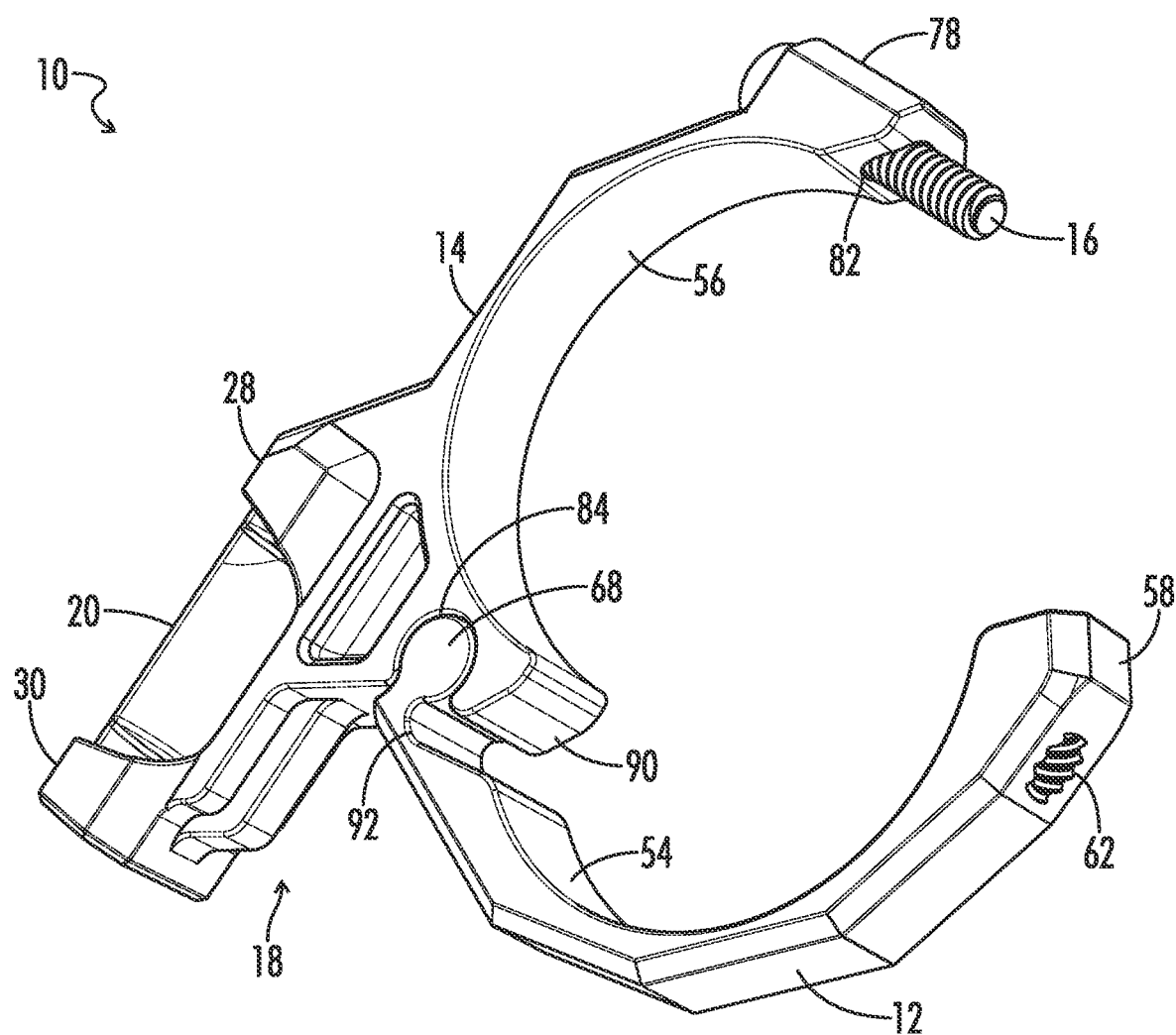
FIG. 10 is a depressed rear perspective view of the level indicator of FIG. 3 showing the level indicator in an open position.
Figure 11:
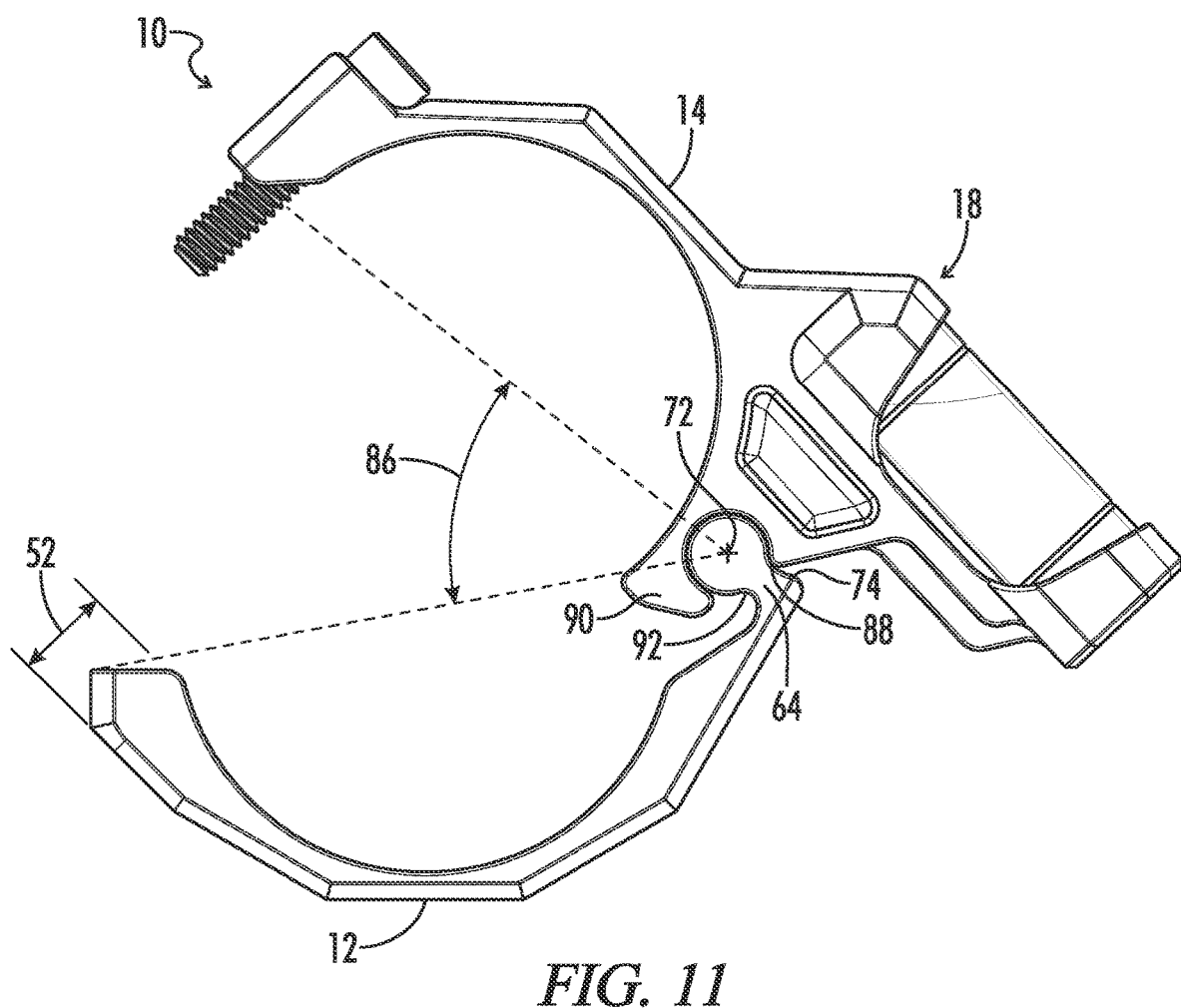
FIG. 11 is a front elevational view of the level indicator of FIG. 10, the back side being a being a mirror image thereof.
Figure 12:
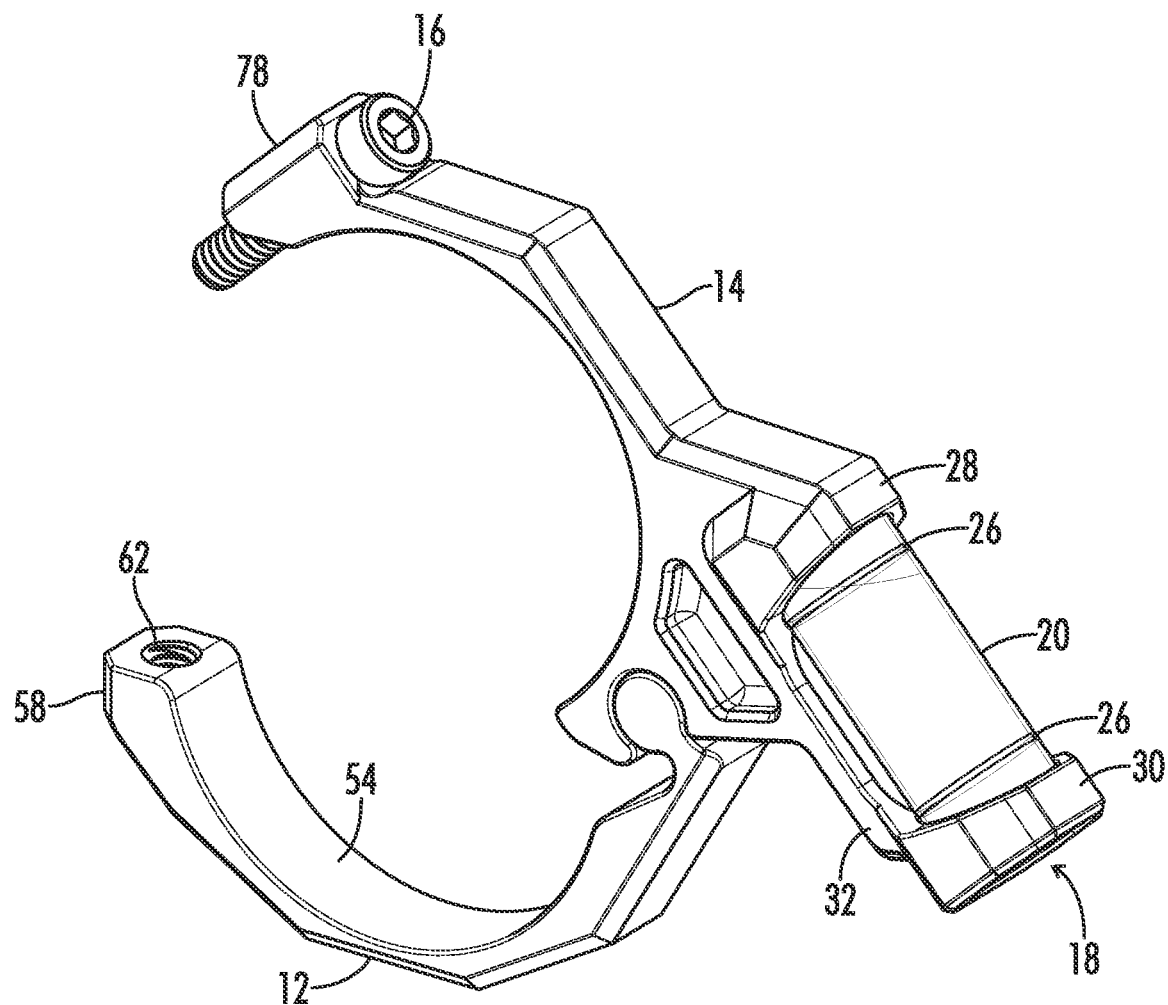
FIG. 12 is another elevated front perspective view of the level indicator of FIG. 10.
Figure 13:
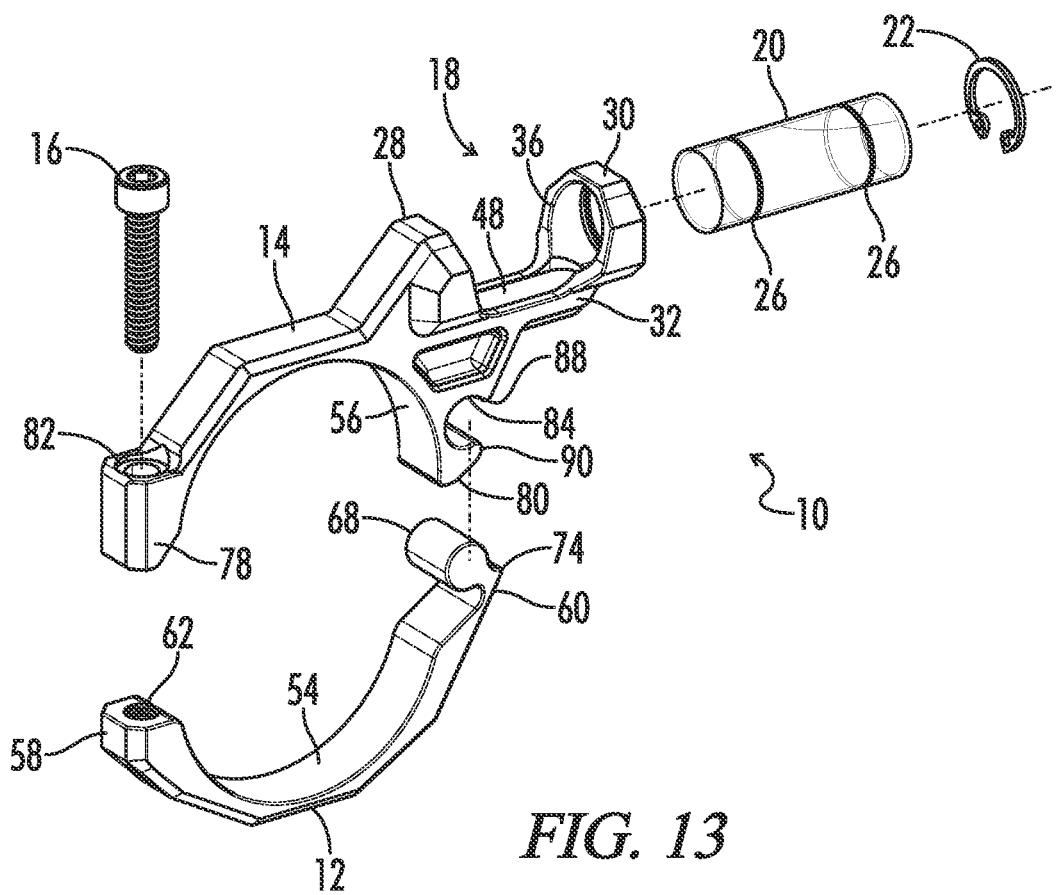
FIG. 13 is an exploded perspective view of the level indicator of FIG. 3.
Figure 14:
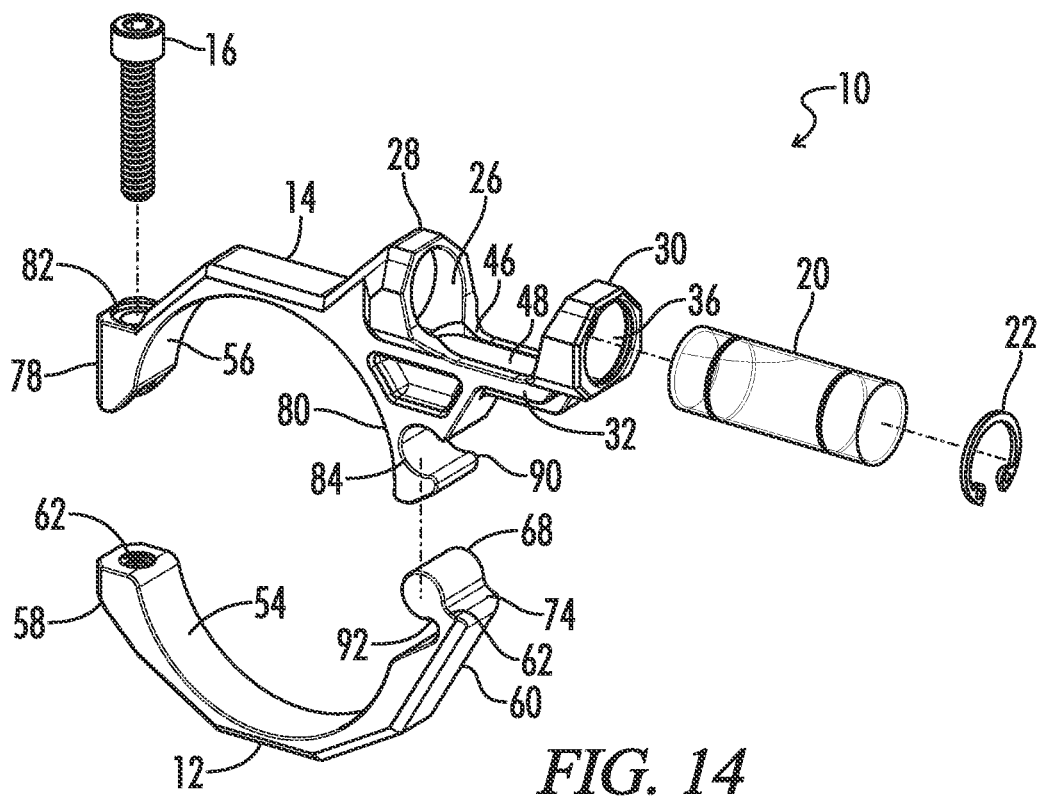
FIG. 14 is another exploded perspective view of the level indicator of FIG. 3.

Similarly, an "upright" position as described herein is considered to be the position of the apparatus or assembly components while in proper operation or in a natural resting position as described and shown herein, for example, in FIG. 5. It is also contemplated that embodiments of the invention may be in orientations other than upright without departing from the spirit and scope of the invention as set forth in the appended claims. Further, the terms "above", "below", "over", and "under" mean "having an elevation or vertical height greater or lesser than" and are not intended to imply that one object or component is directly over or under another object or component, unless specifically indicated to the contrary. The term "when" is used to specify orientation for relative positions of components, not as a temporal limitation of the claims or apparatus described and claimed herein unless otherwise specified.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states.

All combinations of method or process steps as used herein can be performed in any order, unless otherwise specified or clearly implied to the contrary by the context in which the referenced combination is made.

As used herein, the term "about," when referring to a value or to a physical dimension (e.g., length, width, angle, or diameter), is meant to encompass variations of in some embodiments +−40% or more, in some embodiments +−20%, in some embodiments +−10%, in some embodiments +−5%, in some embodiments +−1%, in some embodiments +−0.5%, and in some embodiments +−0.1% from the specified value, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The methods and devices disclosed herein, including components thereof, can comprise, consist of, or consist essentially of the essential elements and limitations of the embodiments described herein, as well as any additional or optional components or limitations described herein or otherwise useful.

Figure 1:
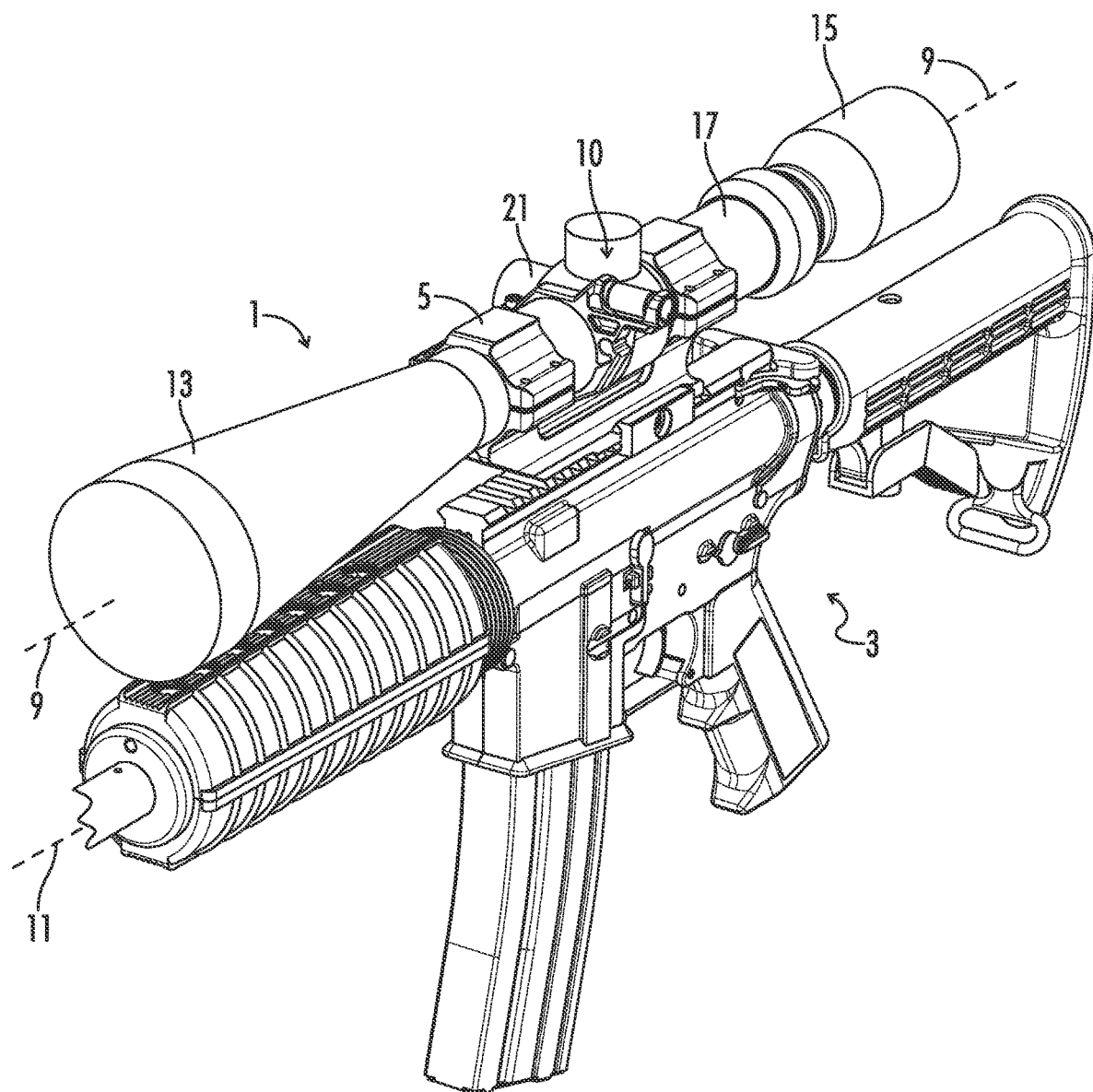
FIG. 1 is an elevated perspective view of a level indicator for telescopic sights shown installed on a telescopic sight mounted to a rifle.
Figure 2:
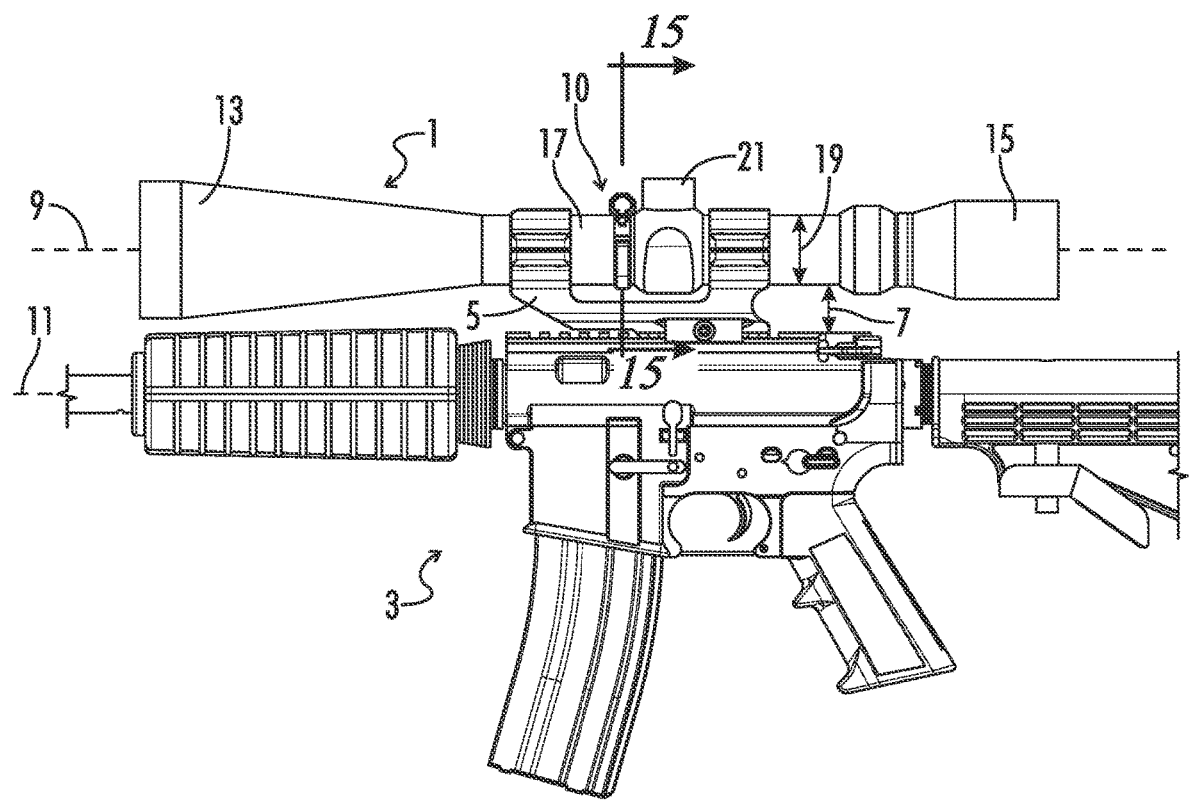
FIG. 2 is a left side elevational view of the objects of FIG. 1.
Figure 3:
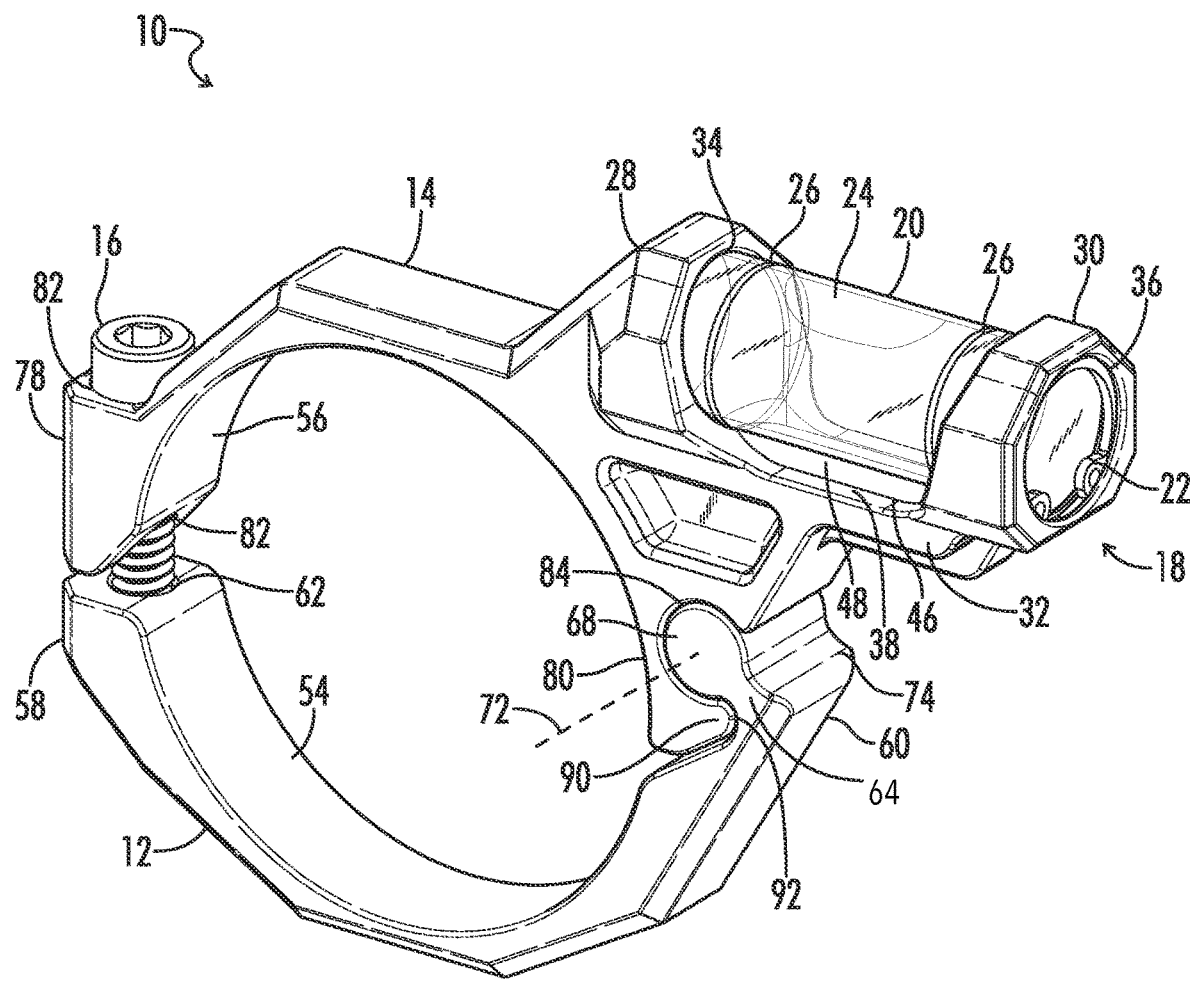
FIG. 3 is an elevated front perspective view of the level indicator of FIG. 1 showing the level indicator in a closed position.
Figure 4:
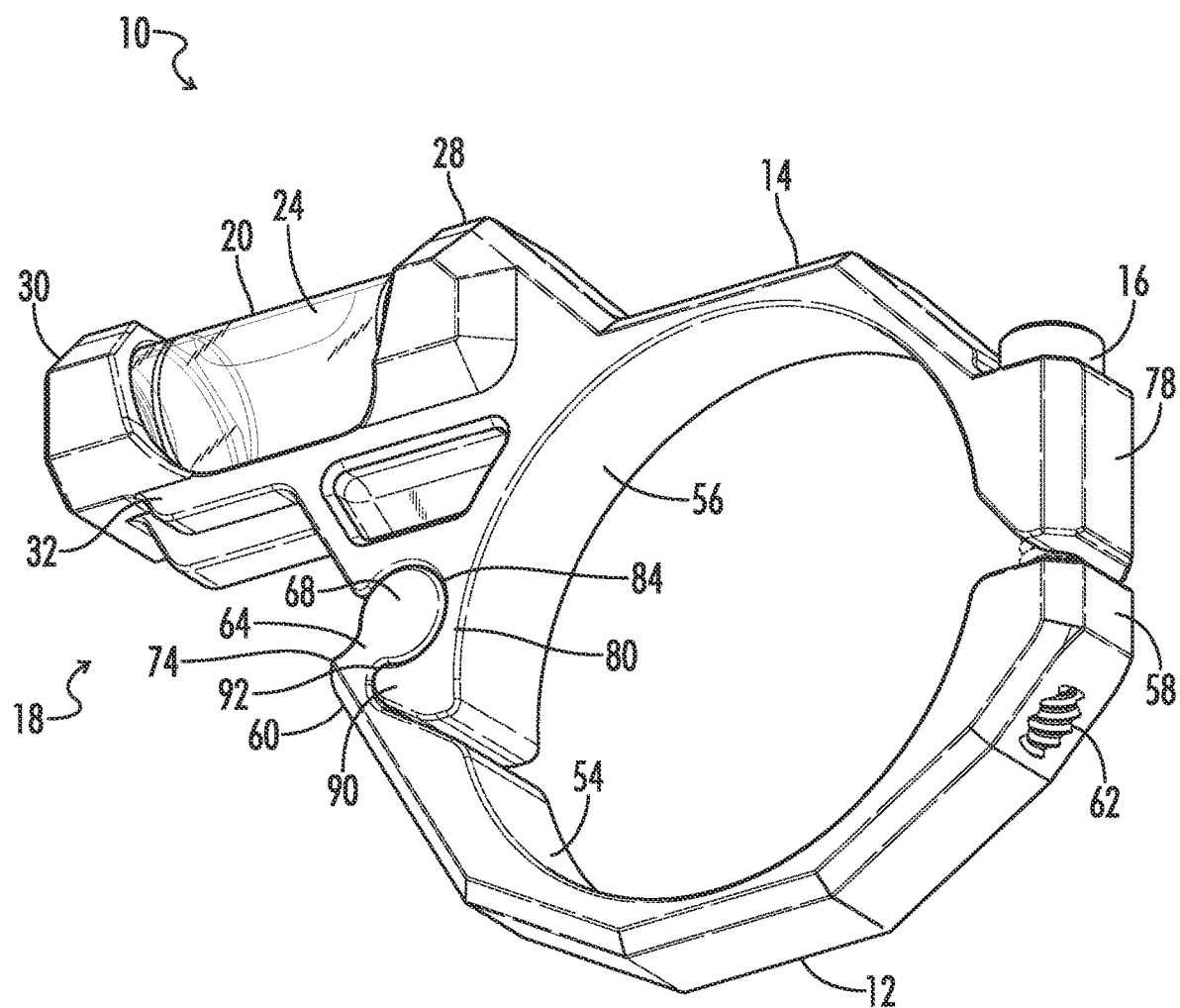
FIG. 4 is a depressed rear perspective view of the level indicator of FIG. 3.

Referring initially to FIGS. 1-2, there is shown a telescopic sight (i.e., scope) 1 mounted to a firearm in the form of a rifle 3. The telescopic sight 1 is mounted to the rifle 3 via a scope mount 5. The scope mount 5 spaces the outer surface of the telescopic sight 1 a distance 7 from the adjacent surface of the rifle 3 and maintains the axis 9 of the scope parallel to the axis 11 of the bore of the rifle barrel. The telescopic sight 1 includes an objective bell 13, an eye bell 15, a tubular portion 17 having a diameter 19, and multiple adjustment knobs 21 or turrets. An embodiment of a level indicator 10 for a telescopic sight is shown detachably attached to the telescopic sight 1.

Referring now to FIGS. 3-14, a level indicator 10 for a telescopic sight 1 includes a half round or semi-annular lower clamp member 12, and a corresponding half round or semi-annular upper clamp member 14 configured to be hingedly engaged with the lower clamp 12 member at one end. A threaded fastener 16 receivable in the lower clamp 12 member through the upper clamp member 14 releasably secures the opposite ends of the clamp members 12, 14 together when the clamp members are hingedly engaged and positioned around the tubular portion 17 of the telescopic sight 1. A level housing 18 in which a level 20 is removably received extends from the upper clamp member 14. The level housing 18 can alternatively extend from the lower clamp member 12. The level 20 is releasably secured in the level housing 18 by a retaining ring 22, which can alternatively be a set screw, an adhesive, a press fit, or other retaining means. When detachably attached to a telescopic sight 1 as disclosed herein, the level indicator 10 can be used to vertically align the axis 9 of the telescopic sight 1 with the axis of the rifle barrel bore 11 and thereby reduce or eliminate the occurrence of cant error during aiming and shooting of the rifle 3.

The level 20 is depicted in the figures as a tubular spirit level (widely known as a "bubble level") comprising a transparent, very slightly curved tubular vial incompletely filled with a liquid so as to form within the vial a gravity driven bubble 24 which when centered between two parallel vertical marks 26 or lines on the vial 20, indicates that the level 20 is flat (i.e., parallel to a horizontal reference plane which is perpendicular to true vertical) and thus that the rifle 3 to which the level indicator 10 is detachably attached is perfectly vertical or plumb. In other embodiments, the level 10 can be an electronic device with lights and/or audio tones to indicate when the level is parallel to the horizontal reference plane and thus when the axis 9 of the telescopic sight 1 is vertically aligned with the axis of the rifle barrel bore 11.

The level housing 18 includes an upwardly extending proximal lobe 28, an upwardly extending distal lobe 30, and an arm 32 extending horizontally from a bottom of the proximal lobe 28 to a bottom of the distal lobe 30. The proximal lobe 28 defines a first cylindrical cavity 34 in which a first end of the level 20 is receivable. The distal lobe 30 defines a second cylindrical cavity 36 in which a second end of the level 20 is receivable. The first and second cavities 34, 36 have a uniform diameter and are axially aligned over the arm 32. An upper surface 38 of the arm 32 extending between the proximal and distal lobes 28, 30 is recessed from a horizontal reference plane 40 tangent to the bottom of the first and second cavities 34, 36 such that the upper surface 38 of the arm 32 is spaced below a bottom of the level 20 when the first and second ends of the level 20 are received in the respective first and second cylindrical cavities 34, 36. In this way, the proximal and distal lobes 28, 30 suspend the level 20 a distance above the upper surface 38 of the arm 32 when the first and second ends of the level 20 are received in the respective first and second cylindrical cavities 34, 36. This allows dramatically more ambient light to enter the vial 20 than conventional levels in which the vial is typically received against or recessed inside a portion of the level housing in order to protect the level from exposure to and accumulation of dirt and grime.

In addition, the arm 32 of the level housing 18 has a width 42 which is less than a diameter 44 of the level vial 20, which allows even more ambient light to enter the vial from a wider angle around the circumference of the vial. In some embodiments, the upper surface 38 of the arm 32 can define a shallow elongated channel 46 below the vial 20. A strip of reflective material 47 can be received in the channel 48 in order to reflect still more ambient light into the vial 20. This even further increases the amount of ambient light which enters the vial and illuminates the bubble 24 against the indicator marks 26. As such, a level indicator 10 which includes the level housing 18 disclosed herein provides a shooter with maximum light refraction for optimal level fluid illumination and sight acquisition in all conditions and environments.

Each clamp member 12, 14 has a width 50, a thickness, and an arcuate inner surface, 54, 56 respectively. The width 50 of each clamp member can be the same or different, as can the thickness 52 of each clamp member. In the exemplar embodiment depicted in the figures, each clamp member 12, 14 has the same width 50. In order to minimize the portion of the length of the telescopic sight 1 that is required to attached the level indicator 10, the width 50 of the clamp members 12, 14 is less than the width of each of the level housing 18 and the level 20 itself. By contrast, for reasons noted above, the straps forming each half of currently available level indicators tend to have a width which is wider than that of the level. When the clamp members 12, 14 are assembled as described herein, the opposing arcuate inner surfaces 54, 56 define between them a space 55 in which the tubular portion 17 of the telescopic sight 1 is receivable. The space 55 can be sized to have a diameter which is slightly less than the diameter 19 of the tubular portion 17 of the telescopic sight 1 in order to ensure that the level indicator 10 fits snugly around the telescopic sight 1 when the level indicator 10 is detachably attached to the sight 1.

The lower clamp member 12 includes a first end 58 and a second end 60. The first end 58 of the lower clamp 12 member has a maximum thickness 52 which is less than the distance 7 that the telescopic sight 1 is spaced from the rifle 3 by the scope mount 5. This allows a user to install a level indicator 10 of the present invention onto a telescopic sight 1 which is already mounted to a rifle 3 without first removing the sight 1 from the rifle 3 (as described in more detail below). A threaded aperture 62 sized and shaped to threadingly receive the threaded fastener 16 is formed in the first end 58. The second end 60 defines a narrow neck 64 having a thickness 66 and a cylindrical joint head 68 protruding from the neck 64. The joint head 68 has a diameter 70 and an axis 72. The thickness 70 of the neck 64 is less than the diameter 70 of the cylindrical joint head 68. The neck 64 extends at an angle from a terminal end or shoulder 74 of the second end 60 to a side of the cylindrical head 68 distal to the first end 58 of the lower clamp member 12. Put differently, the neck 64 extends from the shoulder 74 to a side of the cylindrical head 68 opposite the first end 58 of the lower clamp member 12. The neck 64 extends from the shoulder 74 back toward the first end 58 of the lower clamp member 12 at an angle to an adjacent exterior surface 76 of the second end 60 of the lower clamp member 12. In some embodiments, the angle can be an obtuse angle. In other embodiments, the angle can be an acute angle. In one embodiment, the neck 64 extends back toward the first end 58 of the lower clamp member 12 at an angle substantially normal to exterior surface 76, as most clearly exemplified in FIG. 5. The neck 64 can form an angle with the exterior circumferential surface 76 of the second end 60 of the lower clamp member 12 of from about 75 degrees to about 105 degrees. For reference, the portion of neck 64 used to determine the angle formed with exterior surface 76 is the side of the neck 64 distal to arcuate inner surface 54.

The upper clamp member 14 includes a first end 78 and a second end 80. A counterbored access hole 82 through which the threaded portion of the threaded fastener 16 can pass is defined in the first end 78. A socket 84 in which the cylindrical joint head 68 is rotatably receivable is defined in the second end 80. When the cylindrical head 68 of the lower clamp member 12 is received in the socket 84 of the upper clamp member 14, the respective second ends 60, 80 of the clamp members 12, 14 form a cylindrical joint with two degrees of freedom. This permits the cylindrical head 68 to be rotated within the socket 84 about the axis 72 of the cylindrical head 68 and translated (i.e., slide) laterally in and out of the socket 84 along the axis 72. As such, when the cylindrical head 68 is received in the socket 84, the upper clamp member 14 is rotatable about the cylindrical head 68 between a closed position (see, e.g., FIGS. 5-9) and an open position (see, e.g., FIGS. 10-12).

The male 68 and female portions 84 of the cylindrical joint (i.e., the cylindrical head 68 and the socket 84, respectively) are shaped and sized so that the upper clamp member 14 can be rotated about the cylindrical head 68 so that a distance 85 formed between the respective first ends 58, 78 of the upper and lower clamp members 12, 14 is greater than the diameter 19 of the tubular portion 17 of the telescopic sight 1 when the level indicator 10 is in an open position. As such, the upper clamp member 14 is rotatable about the cylindrical head 68 to form between the respective first ends 58, 78 of the clamp members 12, 14 a gap 85 through which the tubular portion 17 of the telescopic sight 1 is receivable into the space 55 between opposing arcuate surfaces 54, 56. In this way, the telescopic sight 1 is receivable in the space 55 through the gap 85 formed between the respective first ends 58, 78 of the clamp members 12, 14 when the level indicator 10 is placed in an open position.

In order to form a gap 85 that is large enough to accept the telescopic sight 1 therethrough, the cylindrical head 68, neck 64, and the socket 84 are shaped and angled so as to permit the upper clamp member 14 to rotate at least 45 degrees around the cylindrical head 68 when moved from the closed position to the open position. In some embodiments, the cylindrical head 68, neck 64, and the socket 84 can be shaped and angled so as to permit the upper clamp member 14 to rotate from about 45 degrees to about 90 degrees or more around the cylindrical head 68. For example, the level indicator 10 can be configured to form between the respective first ends 58, 78 of the clamp members 12, 14 and the axis 72 of the cylindrical head 68 an interior angle 86 of from about 45 to about 90 degrees. In some embodiments, the interior angle 86 can be about 50, 55, 60, 65, 70, 75, 80, or 85 degrees.

The level indicator 10 is also configured to limit rotation of the upper clamp member 14 about the cylindrical head 68 of the lower clamp member 12. For example, the second end 60 of the lower clamp member 12 define a protruding shoulder 74 while the second end 80 of the upper clamp member 14 defines a protrusion which can take the form of a chine 88. The protrusion or chine 88 can partially define an upper portion of the socket 84, as best shown in FIG. 5. The protrusion or chine 88 can be sized and shaped to contact the neck 64 or shoulder 74 of the lower clamp member 12 and thereby limit rotation of the upper clamp member 14 about the cylindrical head 68. Limiting the rotation of the upper clamp member 14 relative to the lower clamp member 12 advantageously prevents the two clamp members 12, 14 from becoming separated during installation by preventing the upper clamp member 14 from rotating off of the back of the cylindrical head 68. In some embodiments, the chine 88 can limit rotation of the upper clamp member 14 relative to the lower clamp member 12 to from about 45 degrees to about 90 degrees. In some embodiments, the chine 88 can limit rotation of the upper clamp member 14 relative to the lower clamp member 12 to about 50, 55, 60, 65, 70, 75, 80, or 85 degrees. In this way, the socket 84 can function as a constraint on the cylindrical joint.

As noted above, some currently available level indicators require multiple fasteners and relatively wider collars or straps in order to securely attach to a telescopic sight, and undesirably distribute clamping force radially outward through their jointed ends. The level indicator 10 of the present invention, by contrast, is advantageously designed so that only a single threaded fastener 16 is needed to releasably secure the two clamp members 12, 14 together around a telescopic sight 1. Specifically, the level indicator 10 of the present invention advantageously incorporates a cylindrical joint with unique geometry designed to secure the respective second ends 60, 80 of the clamp members 12, 14 together and vertically distribute force when the respective first ends 58, 78 of the clamp members 12, 14 are secured together by a single threaded fastener 16.

For example, as shown in FIGS. 3-14, the second end 80 of the upper clamp member 14 defines an upwardly extending arcuate tooth 90, while the second end 60 of the lower clamp member 12 defines a complimentary upwardly extending arcuate recess 92 in which the tooth 90 is receivable. The tooth 90 and recess 92 are shaped and sized to enable the tooth 90 to cam upwardly into the recess 92 around a bottom of the cylindrical head 68 so as to lock the second end 80 of the upper clamp member 14 to the second end 60 of the lower clamp member 12 when the level indicator 10 is attached to a telescopic sight 1.

Specifically, the tooth 90 extends upwardly from the second end 80 of the upper clamp member 14 in a direction away from the first end 78 of the upper clamp member 14 such that an upper surface of the tooth defines a bottom surface of the socket. Conversely, a bottom of the cylindrical head 68 partially defines the recess 92 such that the recess 92 extends around the bottom of the cylindrical head 68 and above a horizontal reference plane 94 tangent to the bottom of the cylindrical head 68. The terminal end (i.e., back end) of the recess 92 is located above the plane 94 and is partially defined by a surface of the neck 64 located above the plane. As such, the tip of the tooth 90 extends up around the bottom of the cylindrical head 68 and above the plane 94 when the tooth 90 engages the recess 92 to lock the respective second ends 60, 80 of the clamp members 12, 14 together around the telescopic sight 1 when the threaded fastener 16 is received in the first ends 58, 78.

The threaded fastener 16 is threadingly receivable in the threaded aperture 62 through the access hole 82 to secure the first end 78 of upper clamp member 14 to the first end 58 of the lower clamp member 12 around the tubular portion 17 of the telescopic sight 1 when telescopic sight 1 is received in the space 55 between the clamp members 12, 14. Because the diameter of the space 55 is smaller than the diameter 19 of the telescopic sight 1, tightening of the threaded fastener 16 in the threaded aperture 62 causes the upper clamp member 14 to slide around the circumference of the telescopic sight 1 (i.e., transverse to axis 9), which in turn causes the tooth 90 to cam around the bottom of the cylindrical head 68 up into the recess 92. This causes the tip of the tooth 90 to apply an upwardly (as opposed to an radially outward) force to a side of the cylindrical head 68 opposite the telescopic sight 1, which tightly locks the respective second ends 60, 80 of the clamp members 12, 14 together without the need for multiple threaded fasteners in both ends of the clamp members or the wider clamp members found in conventional level indicators.

FIGS. 15-20 depict one embodiment of a method of installing a level indicator 10 of the present invention on a telescopic sight 1 mounted to a rifle 3. Unlike currently available level indicators, a level indicator 10 of the present invention is designed to be assembled before it is installed on a telescopic sight 1 so a user can quickly and easily position the assembled level indicator 10 on and secure it to the telescopic sight 1 with only two fingers of one hand.

Figure 15:
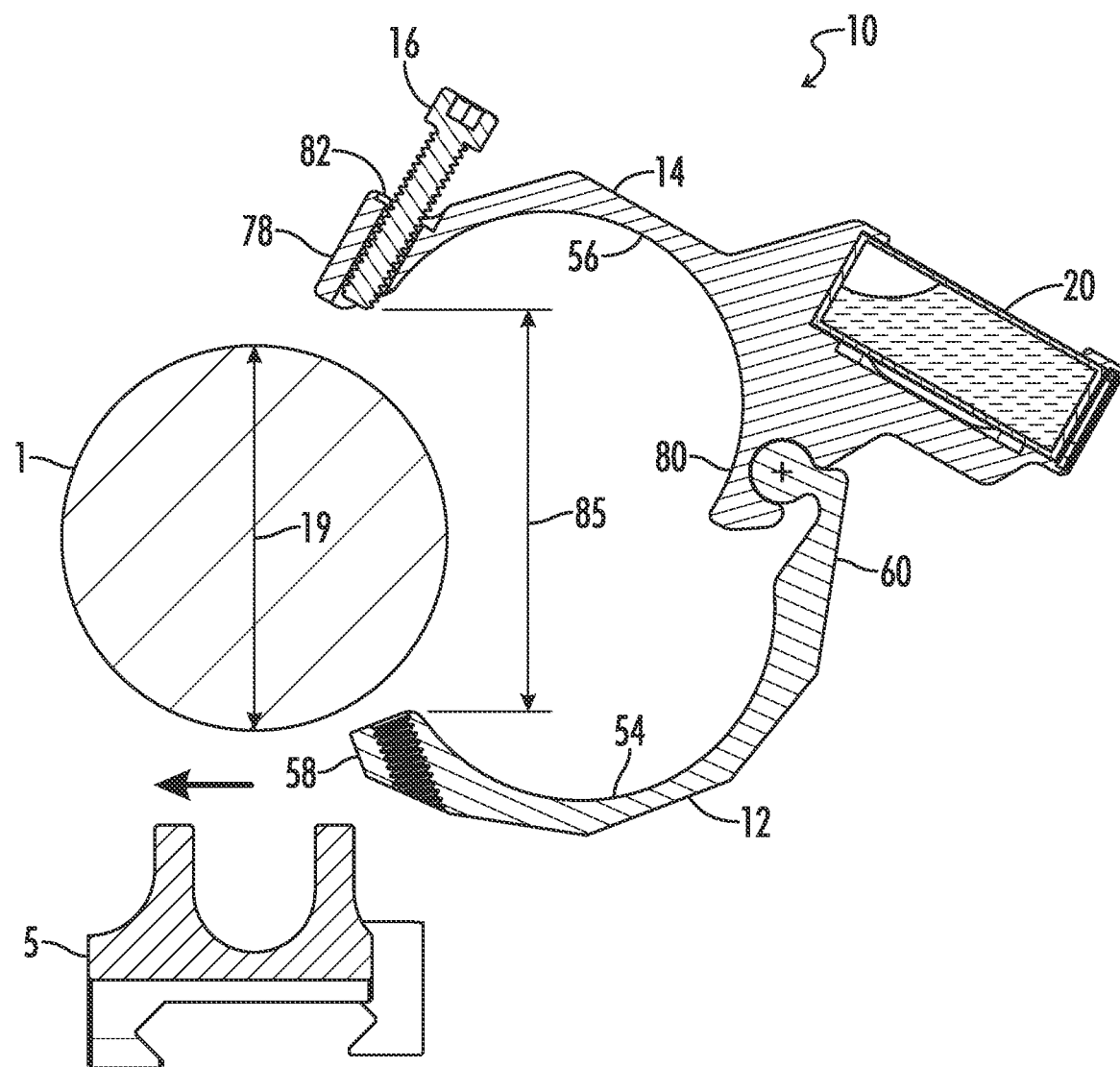
FIG. 15 is a fragmentary cross-sectional view of the objects of FIG. 2 taken along line 15-15 depicting a step of installation of the level indicator on the telescopic sight.
Figure 16:
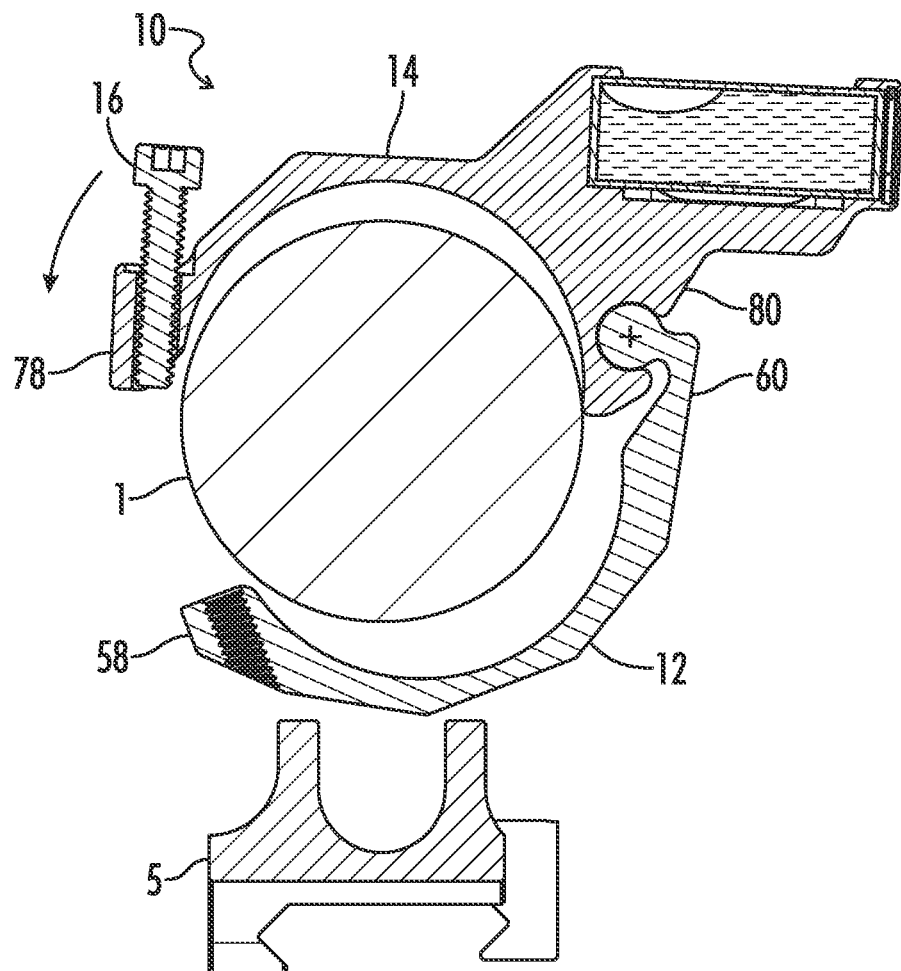
FIG. 16 is a cross-sectional view of the objects of FIG. 15 depicting another step of installation of the level indicator on the telescopic sight.

For example, the level indicator 10 can be assembled by placing the cylindrical head 68 of the lower clamp member 12 inside the socket 84 of the upper clamp member 14 and placing the threaded fastener 16 in the counterbored access hole 82, as best shown in FIG. 15. The first ends 58, 78 of the respective clamp members 12, 14 can be separated (either before or after the cylindrical head 68 is placed inside the socket 84) to form the gap 85 through which the telescopic sight 1 is receivable into the space 55 between the upper 14 and lower 12 clamp members.

Figure 17:
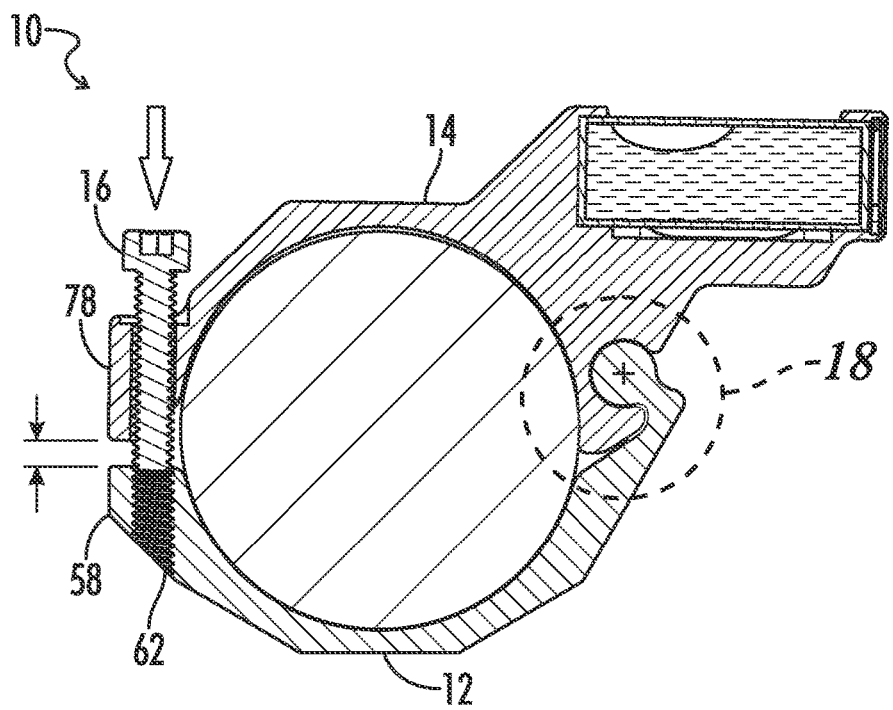
FIG. 17 is another cross-sectional view of the objects of FIG. 15 depicting another step of installation of the level indicator on the telescopic sight.
Figure 17:
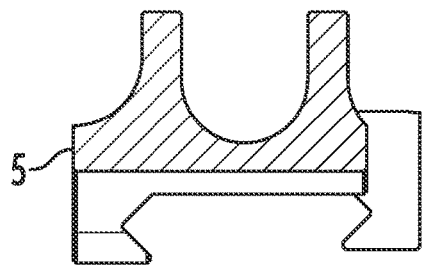
Figure 18:
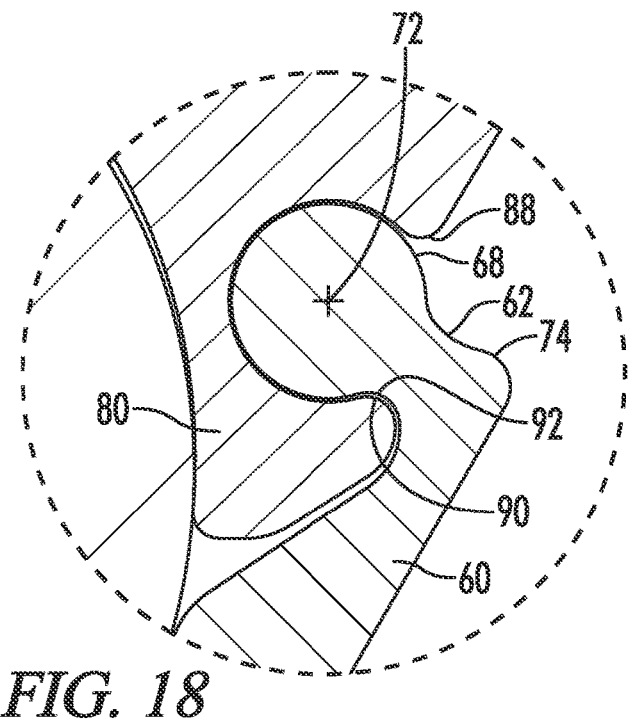
FIG. 18 is an enlarged detail view of FIG. 17 at location 18.

The upper 14 and lower 12 clamp members are then positioned around the telescopic sight 1 such that the telescopic sight is received in the space 55 between the arcuate surfaces 54, 56 of the lower 12 and upper 14 clamp members through the gap 85. This can be accomplished by inserting the first end 58 of the lower clamp member 12 between the telescopic sight 1 and the scope mount 5, or between the telescopic sight 1 and the upper surface of the rifle 3 (according to user preference), and rotating the first end 78 of the upper clamp member 14 about the cylindrical head 68 toward the first end 58 of the lower clamp member 12 to substantially close the gap 85 and place the clamp members 12, 14 in the closed position, as sequentially shown in FIGS. 15-17. The gap 85 is substantially closed and clamp members 12, 14 are in the closed position when the respective inner arcuate surfaces 54, 56 contact the tubular portion 17 of the telescopic sight 1 as best shown in FIG. 17. Notably, the respective first ends 58, 78 of the clamp members do not have to touch and can remained slightly spaced apart even when the gap 85 is substantially closed. At the same time, a small space can also exist between the tip of the tooth 90 and the back of the recess 92, as shown in FIG. 18.

Figure 19:
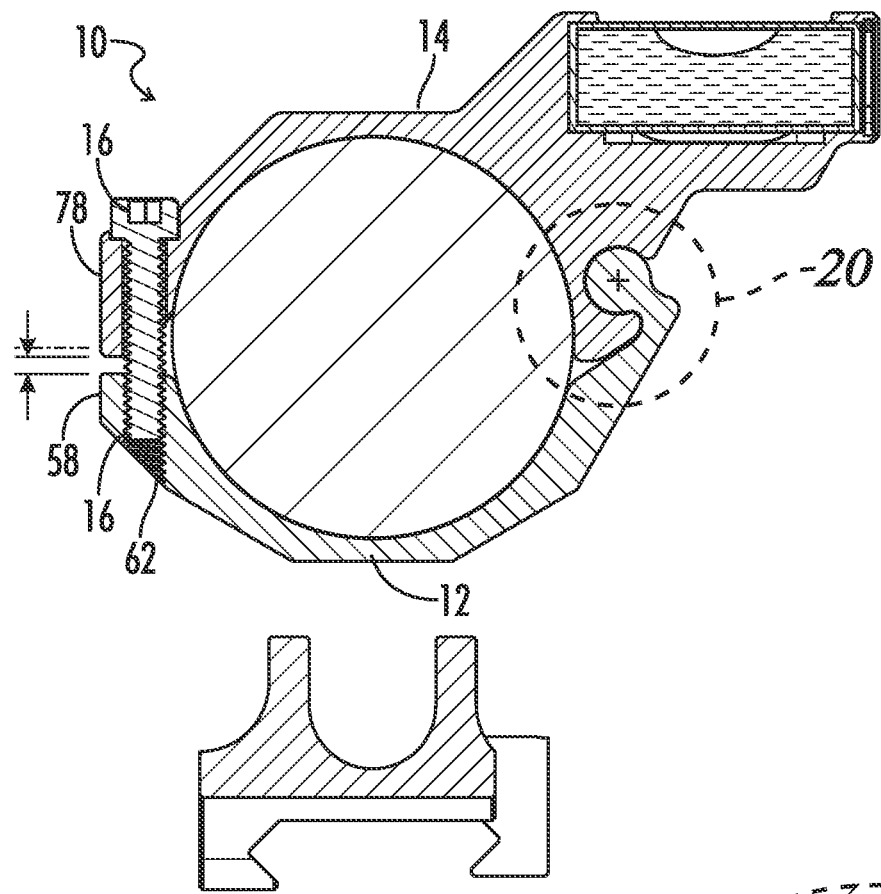
FIG. 19 is yet another cross-sectional view of the objects of FIG. 15 depicting another step of installation of the level indicator on the telescopic sight.
Figure 20:
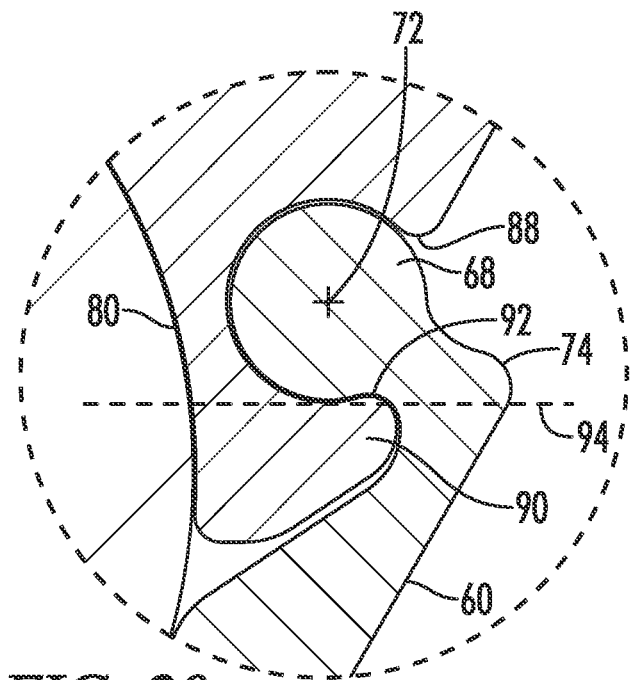
FIG. 20 is an enlarged detail view of FIG. 19 at location 20.

Once the clamp members 12, 14 are in the closed position, the threaded fastener 16 can be threaded into the threaded aperture 62 through the access hole 82 to secure the upper clamp member 14 to the lower clamp member 12 around the telescopic sight 1, as shown in FIG. 19. Threading (i.e., tightening) the threaded fastener 16 further into the threaded aperture 62 shrinks the space between the respective first ends 58, 78 of the clamp members, and causes the tooth 90 to cam further up around the bottom of the cylindrical head 68 into the recess 92 to fully engage the back of the recess 92 as shown in FIG. 20 and previously described. This releasably locks the respective second ends 60, 80 of the clamp members 12, 14 together. Installation of a level indicator 10 of the present invention thus requires no more space along the length of the telescopic sight 1 than the width 50 of either clamp member 12, 14, in stark contrast to conventional level indicators with joints having only a single degree of freedom (i.e., joints that require axial sliding assembly of components along a telescopic sight).

The level indicator 10 can be detached from the telescopic sight 1 by backing the threaded fastener 16 out of the threaded aperture 62, rotating the upper clamp member 14 off of the telescopic sight 1 to separate the respective first ends 58, 78 of the clamp members 12, 14 and form the gap 85, and withdrawing the clamp members 12, 14 out from around the sight 1.

Although embodiments of the present invention have been described in detail, it will be understood by those skilled in the art that various modifications can be made therein without departing from the spirit and scope of the invention as set forth in the appended claims. For example, all components and features of the present invention described as connected to, extending from, or forming a part of the upper clamp member can in other embodiments be connected to, extend from, or form a part of the lower clamp member. Conversely, all components and features of the present invention described as connected to, extending from, or forming a part of the lower clamp member can in other embodiments be connected to, extend from, or form a part of the upper clamp member.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A level indicator for a telescopic sight, comprising:
a lower clamp member including a first end defining a threaded aperture and a second end defining a cylindrical head;
an upper clamp member including a first end defining an access hole and a second end defining a socket in which the cylindrical head is receivable, wherein the upper clamp member is rotatable at least 45 degrees about the cylindrical head when the cylindrical head is received in the socket to form between the respective first ends of the upper and lower clamp members a gap through which the telescopic sight is receivable between the upper and lower clamp members;
a level housing extending from the upper or lower clamp member;
a level received in the level housing; and
a threaded fastener receivable in the threaded aperture through the access hole to secure the upper clamp member to the lower clamp member around the telescopic sight when the telescopic sight is received between the upper and lower clamp members and the cylindrical head is received in the socket.

2. The level indicator of claim 1, wherein:
the upper and lower clamp members include opposing arcuate surfaces which define a space therebetween;
the telescopic sight is receivable in the space through the gap; and
the threaded fastener is receivable in the threaded aperture through the access hole to secure the upper clamp member to the lower clamp member around the telescopic sight when the telescopic sight is received in the space.

3. The level indicator of claim 1, wherein:
the lower clamp member has a width;
the telescopic sight has a length;
a portion of the length of the telescopic sight is required to mount the level indicator on the telescopic sight; and
the portion of the length of the telescopic sight required to mount the level indicator on the telescopic sight is no greater than the width of the lower clamp member.

4. The level indicator of claim 1, wherein the upper clamp member is rotatable no more than 90 degrees about the cylindrical head.

5. The level indicator of claim 1, wherein:
the second end of the lower clamp member defines a neck from which the cylindrical head protrudes;
the neck has a thickness that is less than a diameter of the cylindrical head; and
the neck protrudes from the second end of the lower clamp member at an angle substantially normal to an adjacent exterior surface of the second end of the lower clamp member.

6. The level indicator of claim 5, wherein:
the second end of the upper clamp member defines a chine; and
the chine contacts the neck to limit rotation of the upper clamp member about the cylindrical head to 90 degrees or less.

7. The level indicator of claim 6, wherein:
the neck extends between the second end of the lower clamp member and a side of the cylindrical head distal to the first end of the lower clamp member; and
the chine partially defines an upper portion of the socket.

8. The level indicator of claim 1, wherein:
the second end of the upper clamp member defines a tooth;
the second end of the lower clamp member defines a recess below the cylindrical head in which the tooth is receivable; and
the tooth cams up around a bottom of the cylindrical head into the recess to lock the second end of the upper clamp member to the second end of the lower clamp member when the telescopic sight is received between the upper and lower clamp members, the cylindrical head is received in the socket, and the threaded fastener is received in the threaded aperture through the access hole.

9. The level indicator of claim 8, wherein:
an upper surface of the tooth defines a bottom surface of the socket;
the bottom of the cylindrical head partially defines the recess; and
the recess extends around the bottom of the cylindrical head above a horizontal plane tangent to the bottom of the cylindrical head.

10. The level indicator of claim 9, wherein the tooth extends upwardly from the second end of the upper clamp member in a direction away from the first end of the upper clamp member when the telescopic sight is received between the upper and lower clamp members, the cylindrical head is received in the socket, and the threaded fastener is received in the threaded aperture through the access hole.

11. A method for mounting a level indicator on a telescopic sight attached to a firearm, comprising:

providing a level indicator of claim 1;

placing the cylindrical head in the socket;

separating the respective first ends of the upper and lower clamp members to form the gap through which the telescopic sight is receivable between the upper and lower clamp members;

positioning the upper and lower clamp members around the telescopic sight such that the telescopic sight is received between the upper and lower clamp members through the gap;

rotating the upper clamp member about the cylindrical head to substantially close the gap between the respective first ends of the upper and lower clamp members; and threading the threaded fastener into the threaded aperture through the access hole to secure the upper clamp member to the lower clamp member around the telescopic sight.

12. The method of claim 11, wherein:

positioning the upper and lower clamp members around the telescopic sight includes positioning the lower clamp member between the telescopic sight and the firearm such that an arcuate surface of the lower clamp member is proximate to or received against the telescopic sight; and rotating the upper clamp member is rotating the upper clamp member toward the lower clamp member until an arcuate surface of the upper clamp member is received against the telescopic sight.

13. A level indicator for a telescopic sight, comprising:

a first clamp member including a first end and a second end;

a second clamp member including a first end and a second end, wherein the second end of the second clamp member is hingedly engageable with the second end of the first clamp member such that the respective first ends of the first and second clamp members can be separated and positioned around the telescopic sight when the respective second ends of the first and second clamp members are hingedly engaged;

a level housing extending from the first or the second clamp member;

a level received in the level housing; and a threaded fastener receivable in the first end of the first clamp member through the first end of the second clamp member to secure the second clamp member to the first clamp member around the telescopic sight when the second end of the second clamp member is hingedly engaged with the second end of the first clamp member and the first and second clamp members are positioned around the telescopic sight wherein the second clamp member is rotatable with respect to the first clamp member by at least 45 degrees when the respective second ends of the first and second clamp members are hingedly engaged.

14. The level indicator of claim 13, wherein:

the first end of the first clamp member defines a threaded aperture:

the second end of the first clamp member defines a cylindrical head;

the first end of the second clamp member defines an access hole;

the second end of the second clamp member defines a socket in which the cylindrical head is receivable; and the second clamp member is rotatable about the cylindrical head to form between the respective first ends of the clamp members a gap through which the telescopic sight is receivable between the first and second clamp members.

15. The level indicator of claim 13, wherein:

the second end of the first clamp member defines a neck from which the cylindrical head protrudes;

the second end of the second clamp member defines a chine; and the chine is receivable against the neck to limit rotation of the second clamp member relative to the first clamp member.

16. The level indicator of claim 13, wherein:

the second end of the second clamp member defines an upwardly extending tooth;

the second end of the first clamp member defines an upwardly extending recess in which the tooth is receivable;

the recess extends above a plane tangent to a bottom of the cylindrical head; and the tooth engages the recess to lock the second end of the second clamp member to the second end of the first clamp member when the telescopic sight is received between the upper and lower clamp members, the cylindrical head is received in the socket, and the threaded fastener is received in the threaded aperture through the access hole.

17. A level indicator for a telescopic sight, comprising:

a lower clamp member including a first end defining a threaded aperture and a second end defining a cylindrical head a recess below the cylindrical head, and a neck on which the cylindrical head is formed;

an upper clamp member including a first end defining an access hole and a second end defining a socket in which the cylindrical head is rotatably receivable and a tooth below the socket;

a level housing extending from the upper or lower clamp member;

a level received in the level housing; and a threaded fastener receivable in the threaded aperture through the access hole to secure the first end of the upper clamp member to the first end of the lower clamp member; wherein:

the tooth cams upward into the recess around a bottom of the cylindrical head to lock the second end of the upper clamp member to the second end of the lower clamp member when the telescopic sight is received between the upper and lower clamp members, the cylindrical head is received in the socket, and the threaded fastener is received in the threaded aperture through the access hole the neck extends from the second end of the lower clamp member at an angle of from about 80 to about 100 degrees relative to an adjacent surface of the lower clamp member; and the recess extends around the cylindrical head and above a horizontal plane tangent to the bottom of the cylindrical head.

* * * * *

UNITED STATES PATENT AND TRADEMARK OFFICE
CERTIFICATE OF CORRECTION

| | |
|---|---|
| PATENT NO. | : 11,092,437 B1 |
| APPLICATION NO. | : 17/120787 |
| DATED | : August 17, 2021 |
| INVENTOR(S) | : McCoy, II et al. |

It is certified that error appears in the above-identified patent and that said Letters Patent is hereby corrected as shown below:

On the Title Page

Change "(72) Inventors: Charles A. McCoy, II, New Meadows, ID (US); Brent R. McCoy, Bellingham, WA (US)" to --(72) Inventors: Charles A. McCoy, II, New Meadows, ID (US); Brent R. McCoy, Bellingham, WA (US); Gunther Weiszl, Moellersdorf (AT)--

Signed and Sealed this
Ninth Day of August, 2022

*Katherine Kelly Vidal*

Katherine Kelly Vidal
*Director of the United States Patent and Trademark Office*